Dec. 25, 1962 W. J. HURFORD ETAL 3,070,527
COMPOSITE FUEL ELEMENT
Filed April 29, 1958 7 Sheets-Sheet 1

WITNESSES
John E. Headley Jr.
G. H. Farmer

INVENTORS
Walter J. Hurford
Robert B. Gordon &
William A. Johnson
BY
Arthur T. Stratton
ATTORNEY Dec. 25, 1962     W. J. HURFORD ETAL     3,070,527
COMPOSITE FUEL ELEMENT Filed April 29, 1958     7 Sheets-Sheet 2

Dec. 25, 1962   W. J. HURFORD ETAL   3,070,527
COMPOSITE FUEL ELEMENT
Filed April 29, 1958   7 Sheets-Sheet 5

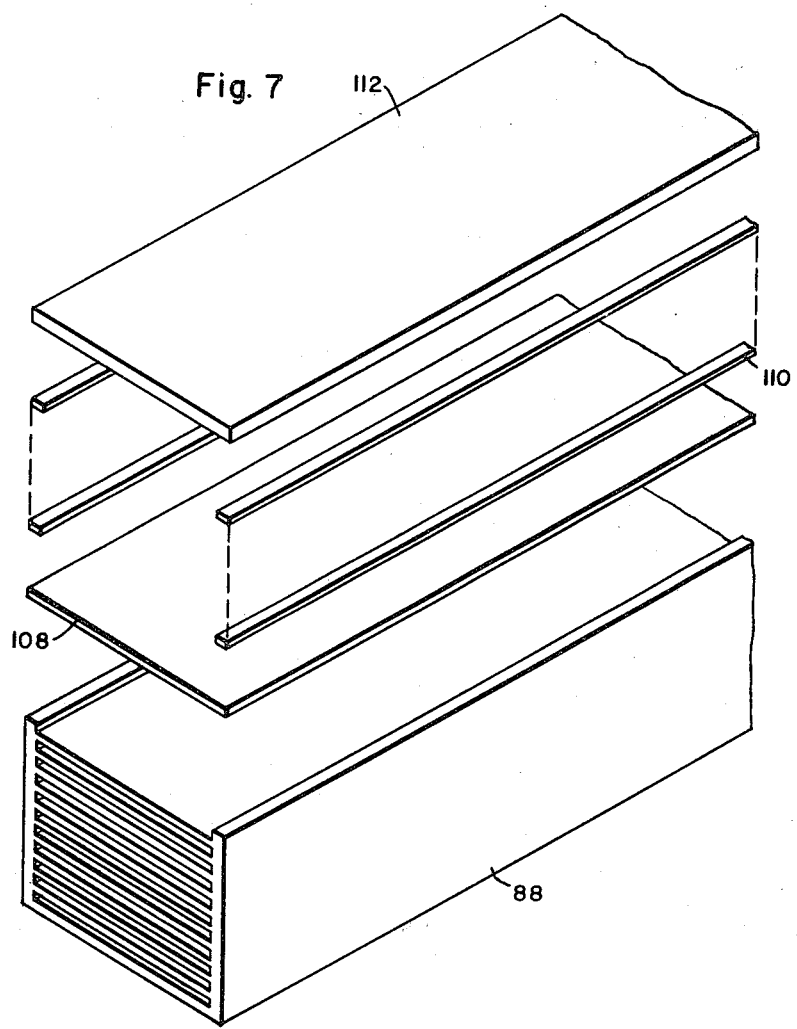

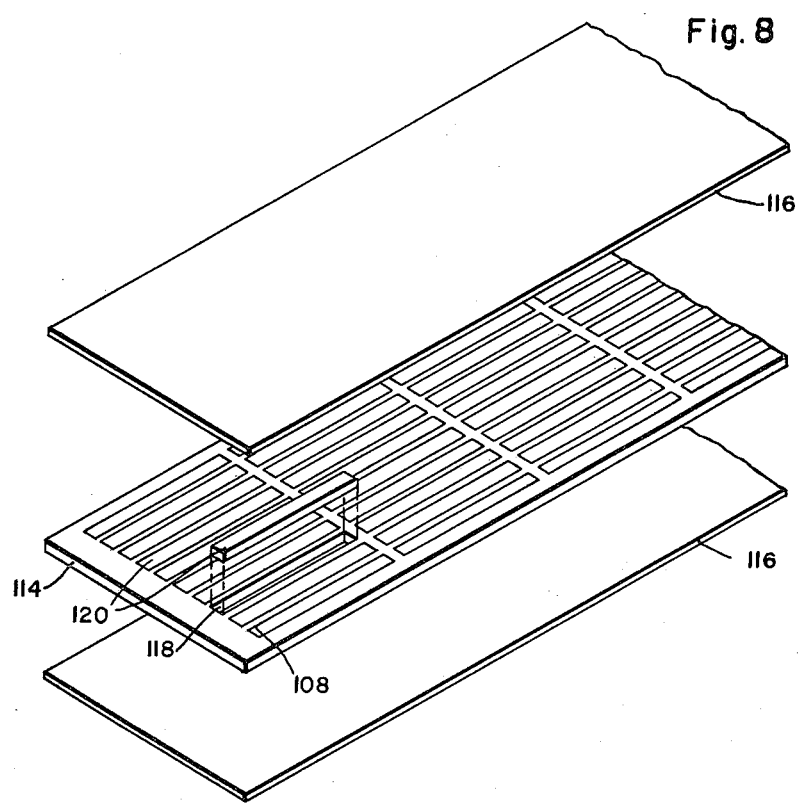

United States Patent Office 3,070,527
Patented Dec. 25, 1962

3,070,527
COMPOSITE FUEL ELEMENT
Walter J. Hurford, Mount Lebanon, Pa., Robert B. Gordon, Los Angeles, Calif., and William A. Johnson, Pepper Pike Village, Ohio, assignors, by mesne assignments, to the United States of America as represented by the United States Atomic Energy Commission
Filed Apr. 29, 1958, Ser. No. 731,801
4 Claims. (Cl. 204—154.2)

The present invention relates generally to neutronic reactors and more particularly to fuel elements adapted for use therein.

Past fuel elements used in neutronic reactors have generally comprised a clad plate type element having the fuel or "meat" therein in a metallic form. A requirement for fuel elements of this type is that the fuel must be metallurgically bonded to the cladding. Fuel elements of this type are usually assembled and then elongated to final size and reduced to final thickness by conventional means such, for example, as by hot rolling. During such working of the fuel element the fuel becomes metallurgically bonded to the cladding to ensure good heat transfer characteristics. The fuel meat used in such elements must therefore be in a metallic form and is usually composed in part of a neutron fissionable isotope such as $U^{233}$, $U^{235}$ or $94^{239}$ or combinations thereof.

Other types of fuel elements have been fabricated in the shape of cylindrical rods in which a ceramic fertile material, such for example, as uranium dioxide, is utilized as the meat. In these instances, the ceramic fertile material comprise a plurality of stacked cylindrical pellet compacts, such for example, as those described and claimed in application Serial No. 584,828, filed May 14, 1956, now Patent No. 2,991,601, issued July 11, 1961, by J. Glatter, B. E. Schaner and T. J. Burke, entitled "Composite Element and Method of Manufacture," and assigned to the same assignee as the present invention. The pellets are located in a cylindrical tube or cladding having end plugs at the open ends thereof and in which the ceramic material is not bonded to the cladding. The cladding material may be formed of a suitable material having a low thermal neutron cross section, such for example, as stainless steel, aluminum, zirconium or an alloy of zirconium. Because of the physical strength properties of zirconium and zirconium alloys, this material is commonly used and is the prefered cladding for most fuel elements.

There are several disadvantages to the use of cylindrical fuel elements having ceramic fuel therein. The disadvantages are that zirconium tubing is difficult to manufacture for any substantial length and in many instances it has been necessary to construct the fuel elements in a plurality of short tubular members which are stacked upon each other rather than using a long single rod. Another disadvantage of tubular ceramic fuel elements is inherent in the structure, for high central temperatures are encountered in the ceramic material due to poor heat transfer characteristics between the ceramic material and the cladding which is in turn caused by the fact that there is no bonding between the fuel and the cladding. This disadvantage is also enhanced by the fact that for tubular fuel elements, the heat transfer surface available between the fuel and the cladding is limited. Additionally, the fuel elements have a relatively large diameter which also increases the central temperatures encountered. In practice, it has been found exceedingly difficult to construct tubular ceramic fuel elements having small diameters to improve their heat transfer characteristics. A more critical disadvantage of fuel elements of this type exists when, during operation of the reactor, the cladding ruptures. The fuel is then exposed to a corrosive and erosive medium in the form of the reactor coolant which is normally at a high temperature and pressure. Since the cladding rupture will elongate, nearly all of the fission products released by the fuel material and a portion of the fuel material itself will enter the coolant and cause the latter to become excessively radio-active necessitating the shutting-down of the reactor and removal of the ruptured element.

The present invention obviates the above-mentioned disadvantages of previous fuel elements by the provision of a flat plate compartmented ceramic fuel element having unbonded fuel therein. By eliminating the requirement of a metallurgical bond between the fuel and the cladding, the fuel element can be made to final dimensions without requiring elongation of the element and reduction in size. Of course, plate type compartmented fuel elements can also be made by the same methods as previous plate type fuel elements such for example as by hot rolling. Additionally, by utilizing a flat compartmented fuel element having ceramic material, the heat transfer surface per unit volume of fuel is increased to a maximum and a thinner fuel element may be constructed by fabricating the fuel element in this manner. High central temperatures in the fuel are not encountered, and the possibility of burnout is substantially reduced, thereby allowing the use of these fuels at a higher reactor operating temperature and additionally allowing a longer life for the fuel element. In fabricating a fuel element to final dimensions where there is no bonding between the fuel element and the cladding, the present invention also provides a substantially uniform cross-section of fuel per unit surface area, for the elimination of elongation of the fuel element eliminates the possibility of non-uniform elongation of the fuel. Since the ceramic material is formed from a powder material and there is no metallurgical bond between the fuel and the cladding, there is a possibility of shifting of the material during operation of the reactor. This invention provides the fuel element with a filler plate having a plurality of compartments in which the fuel material is located. The fuel material may be provided in a packed powder form, where the powders are pressure packed and sintered until they are at about 96% of theoretical density. Thus, each compartment contains a relatively small amount of fuel and the possibility of shifting of the fuel is minimized. By utilizing a plurality of fuel compartments in each fuel element, the amount of fuel material and its fission products exposed to the coolant is appreciably lessened when a rupture in the cladding exists, for cladding voids will not tend to elongate to expose other fuel compartments. Thus, only the fission products of the fuel in the compartments adjacent the cladding rupture is exposed to the coolant and not a major portion of the fuel in the whole fuel element, particularly since the fuel element may be preferably assembled so that each fuel compartment is completely sealed from the other compartments.

The fuel element is preferably constructed to have two cover sheets and a central filler plate having a plurality of compartments therein. Sintered compacts of ceramic material or metallic fuel is located in each of the compartments, and the cover plates are secured to the filler plate by suitable means, such for example, as bonding or welding. It is also to be noted that the use of compartmented plate-type fuel elements also reduces the number of individual fuel elements that must be fabricated for the reactor as compared to rod-type fuel elements, for in certain reactors, one plate-type fuel element may be substantially equivalent to seventy rod-type elements.

As can be appreciated, this invention also has many advantages over present plate-type fuel elements. In present plate-type fuel elements, the fuel has susceptibility to a continuous rupture if a small portion of the cladding fails. By using a compartmented plate element, the possibility of a continuous rupture is eliminated. Additionally as hereinbefore pointed out, since in one form, the fuel element may be fabricated so that no metallurgical bond between the fuel and the cladding exists, a compartmented fuel element may be fabricated to final dimensions, eliminating the need for hot working of the fuel element and assuring a uniform cross-section of fuel per unit surface area.

It is to be further noted that the fuel element may be constructed to have a metallic fuel meat rather than fuel meat in ceramic form and the fuel element in this instance will also be protected from a continuous rupture as hereinbefore pointed out.

Accordingly, it is one object of this invention to provide a novel fuel element formed as a clad compartmented plate.

Another object of this invention is to provide a novel compartmented plate-type fuel element containing a fissile material in ceramic form.

Another object of this invention is to provide a sandwich-type clad fuel element having a central filler comprising a plate provided with a plurality of compartments adapted for locating a fuel material therein and having a pair of covers to enclose the filler plate.

Still another object of this invention is to provide a novel clad plate-type compartmented ceramic fuel element having a cladding formed from a corrosion resistant material having a low thermal neutron cross-section and having the fuel formed from a ceramic composition containing a fissile material.

A still further object of this invention is to provide a novel clad plate-type compartmented fuel element having a cladding formed from a corrosion resistant material having a low thermal neutron cross-section and having the fuel formed from a fissile material.

These and other objects of this invention will be more easily understood from the following detailed description of one embodiment of this invention with reference to the attached drawings, in which:

FIG. 7 is a perspective exploded view of a fuel element subassembly; and

FIG. 8 is an exploded fragmentary view of a fuel element used in the subassembly of FIG. 7.

To point out the applicability of the present invention there is shown a neutronic reactor of the pressurized light water seed and blanket type. As will hereinafter be more fully described, there is provided a centrally located annular seed of an enriched fissionable material such for example as uranium 235. Surrounding the seed there is provided a blanket region containing a fertile material such, for example, as a fertile ceramic material such as natural uranium in the form of uranium dioxide. For reactors of the pressurized water type, water serves both as the cooling and the moderating media. The coolant flows past the fixed fuel elements and is heated thereby. Heat is then removed from the coolant by means of a separate heat exchanger and the coolant is recirculated through the reactor by means of a pump.

Figure 1:
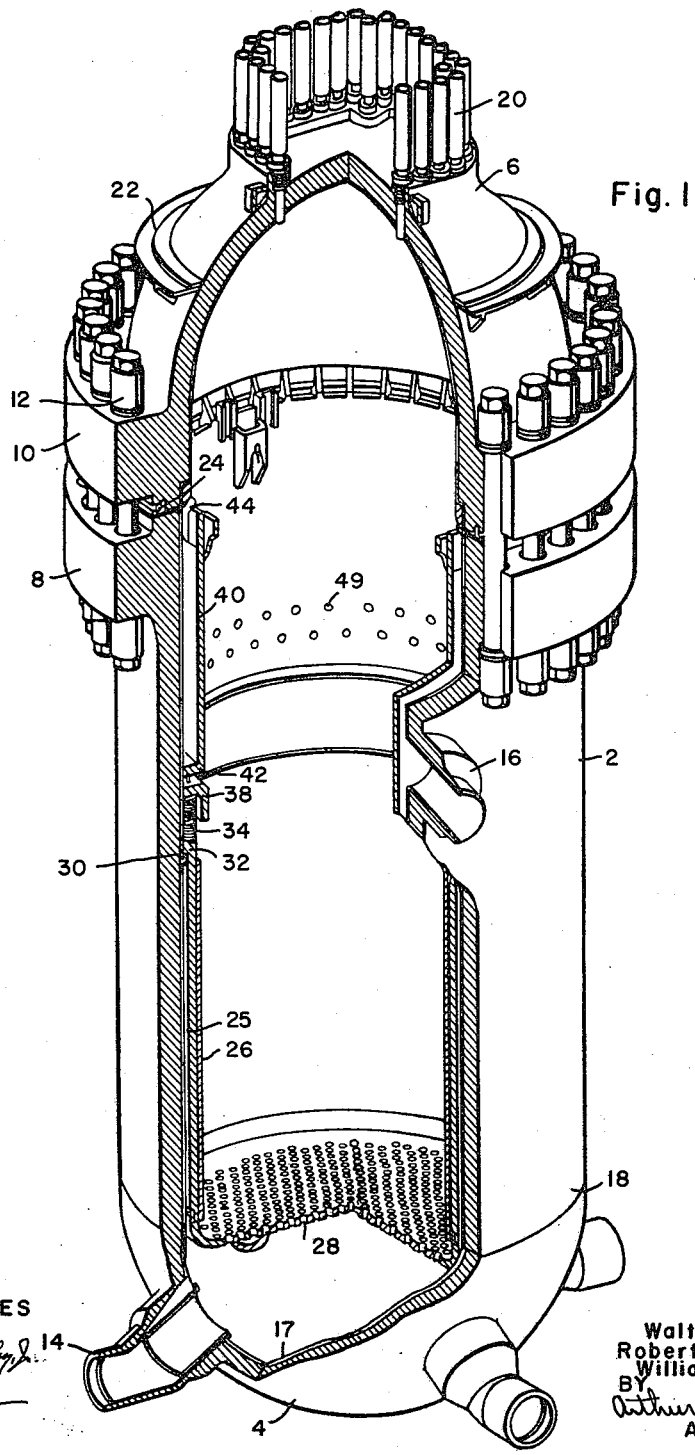
FIGURE 1 is a perspective view of a pressure vessel for a neutronic reactor employing the fuel element and having portions thereof cut away for clarity.
Figure 2:
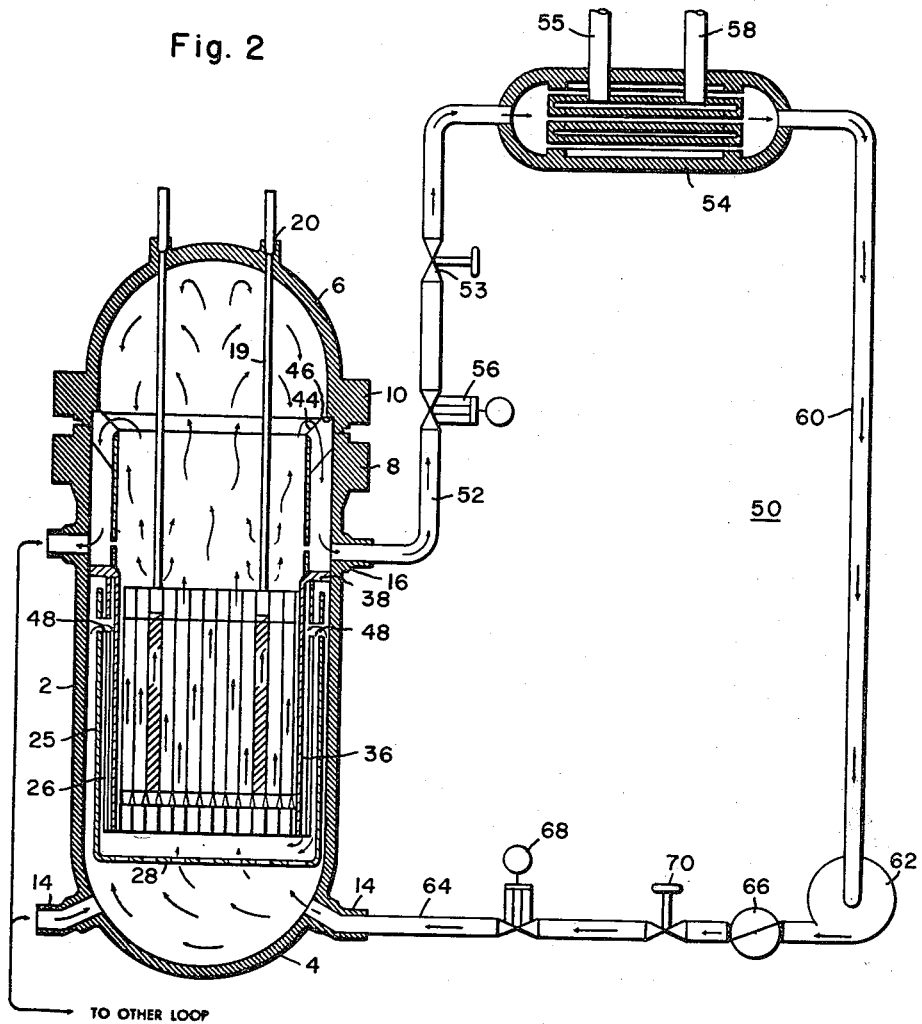
FIG. 2 is a sectional diagrammatic view of the pressure vessel shown in FIG. 1 having the core installed and showing one reactor operating loop in section.

Referring to FIGS. 1 and 2 the pressure vessel 2 for the neutronic reactor may comprise a cylindrical housing having an integral hemispherical base 4. The pressure vessel 2 is generally cup-shaped and has an open top. The open top is covered by means of a vessel head 6 adapted to be bolted thereto. The pressure vessel 2 is provided with an outwardly extending flange 8 surrounding the upper end of the shell adjacent the open side. The head 6 is provided with a similar flange 10 which is adapted to be aligned with the vessel flange 8 when the head is mounted on the vessel. The flanges 8 and 10 are provided with a plurality of aligned openings therethrough for locating a plurality of head bolts 12 for securing the head to the pressure vessel. The vessel base 4 is provided with a plurality of spaced inlet nozzles 14 to allow a coolant to flow into the vessel, and the central portion of the pressure vessel 2 is provided with a plurality of outlet nozzles 16 aligned with the inlet nozzles 14, respectively. The pressure vessel 2 is constructed of a material capable of withstanding the operating pressures of the reactor as well as any high thermal stresses encountered during operation of the reactor. It is constructed to be absolutely leak-tight and corrosion-resistant. The cylindrical portion of the vessel may be constructed of a manganese molybdenum carbon steel and have an inner cladding 17 of a corrosion-resistant material, such, for example, as stainless steel to meet the corrosion resistance requirements. The base 4 and the head 6 of the vessel are constructed of a similar material and the base 4 is secured to the cylindrical portion of the vessel by suitable means such, for example, as welding at 18. The inlet nozzles 14 and the outlet nozzles 16 may also be secured to the vessel 2 and base 4, respectively, by welding. They are additionally provided with a similar stainless steel liner as the pressure vessel itself. The upper surface of the head 6 is provided with a plurality of spaced outwardly extending support members 20 which may be threadedly secured thereto and which serve to mount the control rod operating mechanisms. The supports 20 are hollow and are open to the interior of the pressure vessel so that the control rod operating mechanisms may be connected to the control rods by means of shafts 19 passing therethrough. The head 6 of the pressure vessel may also be provided with an annular platform 22 located at one level of its outer periphery for use by maintenance personnel. As is known, water moderated and cooled neutronic reactors are normally operated at pressures of the order of 2,000 pounds per square inch, and in order to provide a leak proof pressure vessel, there is included a seal weld 24 extending around the periphery of the open side of the vessel shell and securing the head 6 to the vessel 2. All other exits from the pressure vessel and the head 6 may also be provided with similar seal welds. The pressure differential on the seal weld 24 is relieved by means of the head bolts 12. Additionally, each of the inlet nozzles 14 and outlet nozzles 16 is connected to a sealed primary loop 50, and the supports 20 are connected to the control mechanisms which are preferably "canned" to provide no leakage therethrough.

Viewing the interior of the pressure vessel (FIGS. 1 and 2) there are provided two concentric cylinders 25 and 26 called the thermal shields and preferably formed from stainless steel. Each of the thermal shields are also concentric with the cylindrical portion of the pressure vessel 2 and the outer thermal shield 25 is spaced from the pressure vessel wall. The inner thermal shield 26 is located inwardly of the outer thermal shield 25 and is spaced therefrom. The pressure vessel is provided with a peripheral ledge 30 extending inwardly from the inner side wall thereof and the outer thermal shield is provided with an outwardly extending flange located on the flange 32 upper end thereof. The inner thermal shield 26 is preferably secured to the outer thermal shield 25 in a conventional manner and the latter is installed in the pressure vessel by locating the flange 32 on the peripheral ledge 30. The outer thermal shield is also provided with a perforated flow guide 28 located at the lower edge thereof and extending across the bottom of the pressure vessel 2. An annular core support spring 34 is mounted on the flange 32 of the outer thermal shield 25. The core barrel 36 is also constructed in the form of a cylinder and is provided with a support flange 38 which extends laterally outwardly from the upper end thereof and is adapted to be mounted on the upper end of the core support spring 34. The side walls of the core barrel are spaced from the inner side walls of the inner thermal shield to allow coolant to flow therebetween.

When the reactor is in use the upward hydraulic thrust created by the coolant flow may exceed the gravity load produced by the weight of the core and core barrel. To prevent this thrust from raising the core out of position an annular hold-down barrel 40 is mounted above the core barrel and located to engage the support flange 38. The lower end of the hold-down barrel 40 is provided with a flange 42 which is located on the core barrel support flange 38 to provide additional gravity load on the core barrel. The upper end of the hold-down barrel 40 is provided with an outwardly extending flange portion 44 which is adapted to bear against a shoulder 46 on the inner surface of the pressure vessel head 6. It is to be noted that the pressure vessel 2, the thermal shields 25 and 26, the core barrel 36 and the coolant-moderator that flows between these members additionally serve as a reflector for the reactor core.

For one example of specific dimensions for the pressure vessel and its components, reference is made to Table I.

TABLE I

[All dimensions in inches, all weight in tons]

Complete vessel:
   Over-all height, not including control rod
      mechanism housings _____ 389½
   Diameter at bolting flanges _____ 154
Weight: Without core, mechanisms, and coolant_ 275

Vessel shell:
   Over-all height including base _____ 300¾
   Inside diameter _____ 109
   Outside diameter _____ 125¾
   Base—inside radius _____ 55 9/16
   Base—outside radius _____ 61¾
   Nozzles—inside diameter _____ 15
   Nozzles—outside diameter _____ 18
   Weight _____ 150

Closure head:
   Over-all height, not including mechanism
      housings _____ 88¾
   Inside radius _____ 51½
   Outside radius _____ 59¾
   Weight, final closure head _____ 85

Thermal shields:
   Outer thermal shield—
      Over-all height, including flow guide___ 150½
      Flange diameter _____ 108¾
      Cylinder-outside diameter _____ 106
      Cylinder-inside diameter _____ 100
   Inner thermal shield:
      Over-all height _____ 141
      Outside diameter _____ 98½
      Inside diameter _____ 96½
   Weight, complete assembly, including flow guide_ 29
Penetrations:
   Rod-drive mechanism housings (32)—
      Inside diameter _____ 4
      Outside diameter _____ 6
   Core support-spring, weight _____ 2
   Core hold-down barrel, weight _____ 9.3

Viewing FIG. 2, it is to be noted that passages 48 are provided adjacent the upper ends of the inner and outer thermal shields to allow flow of coolant therebetween. Accordingly, coolant enters the reactor vessel through an inlet nozzle 14 and a major portion thereof passes through the flow guide 28 into the lower portion of the core barrel. The remainder of the coolant passes upwardly in the space between the pressure vessel 2 and the outer thermal shield 25. This coolant then reverses itself to flow downwardly between the inner and outer thermal shields 26 and 25 and between the inner thermal shield 26 and the core barrel 36. The coolant is now located between the flow guide 28 and the reactor core and then passes upwardly through the reactor core and into the upper portion of the reactor vessel. The coolant exits from the reactor vessel through the outlet nozzles 16 by means of openings 49 (FIG. 1) located in the sides of the core hold-down barrel 40 and openings (not shown) located in the upper flange 44 of the core hold-down barrel.

The coolant is kept in a completely sealed system or primary loop 50. Each outlet nozzle 16 is connected to an external primary loop 50. Each primary loop 50 comprises piping 52 which connects an outlet nozzle 16 to a heat exchanger 54. The outlet piping 52 may be provided with a pair of series connected stop valves 53 and 56 for controlling the rate of flow of coolant to the heat exchanger. The heat exchanger 54 is preferably provided with two separate flow passages. The primary coolant is located in one of the flow passages and is placed in heat transfer relation with a secondary coolant located in the other flow passage. The heat exchanger 54 is provided with a secondary inlet 55 and a secondary outlet 58 to transport the secondary coolant through the heat exchanger. The primary coolant flows through the heat exchanger and exits therefrom through piping 60. The outlet piping 60 is connected to a centrifugal pump 62 which pumps the primary coolant from the heat exchanger 54 to the inlet nozzle 14 of the loop 50. Return of the primary coolant to the inlet nozzle 14 is accomplished by means of inlet piping 64 connected between the outlets of the pump 62 and the inlet nozzle 14. The inlet piping 64 may preferably be provided with a check valve 66 to prevent reverse flow through the pump, with a pair of series connected stop valves 68 and 70 for controlling the fluid flow into the reactor. Each of the aligned inlet and outlet nozzles are connected to a separate loop and in the reactor shown there are provided four external loops.

Figure 3:
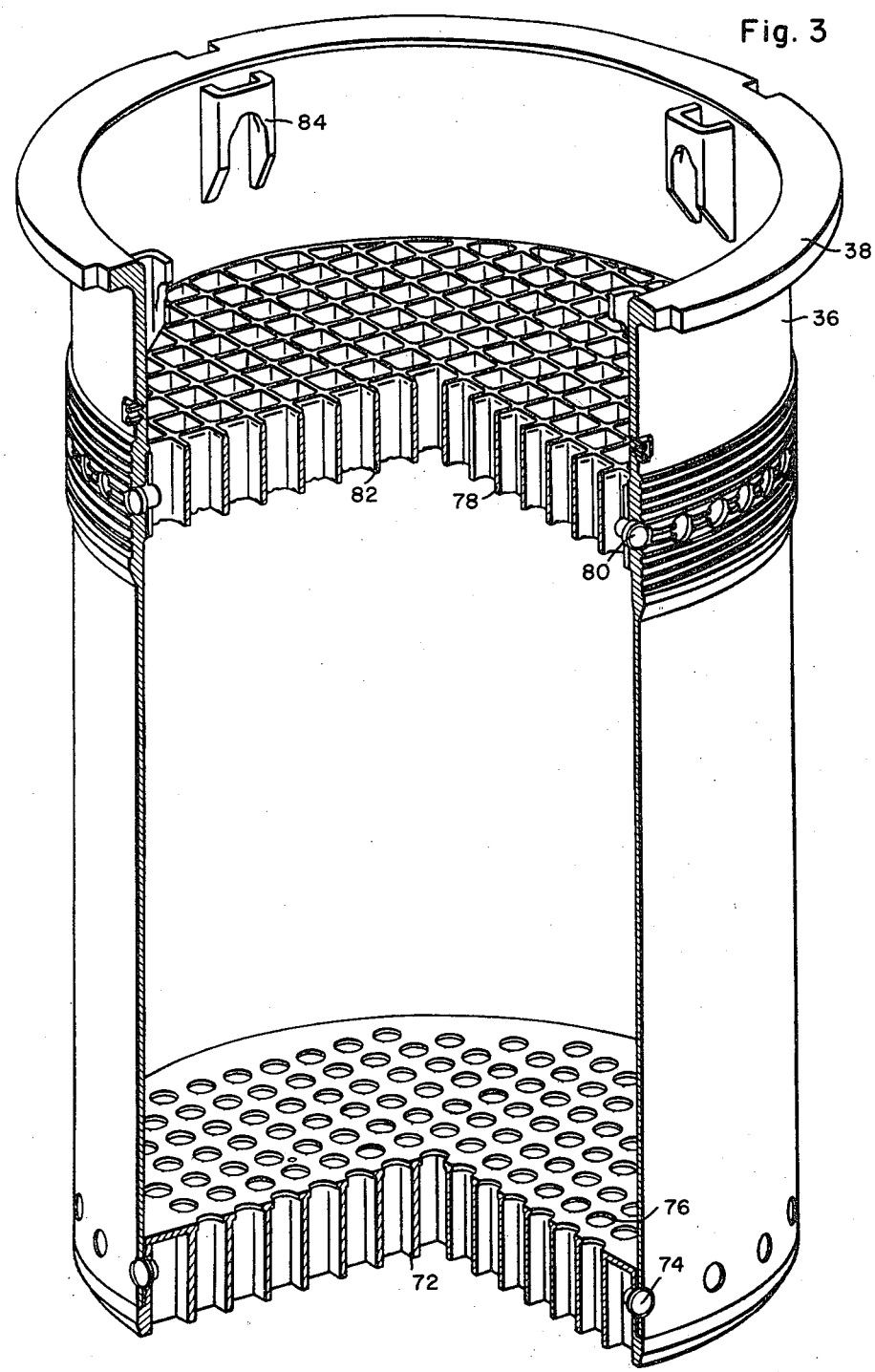
FIG. 3 is a perspective view of a core barrel adapted for use in the pressure vessel shown in FIG. 1 and having portions cut away to show the core supporting structure.
Figure 4:
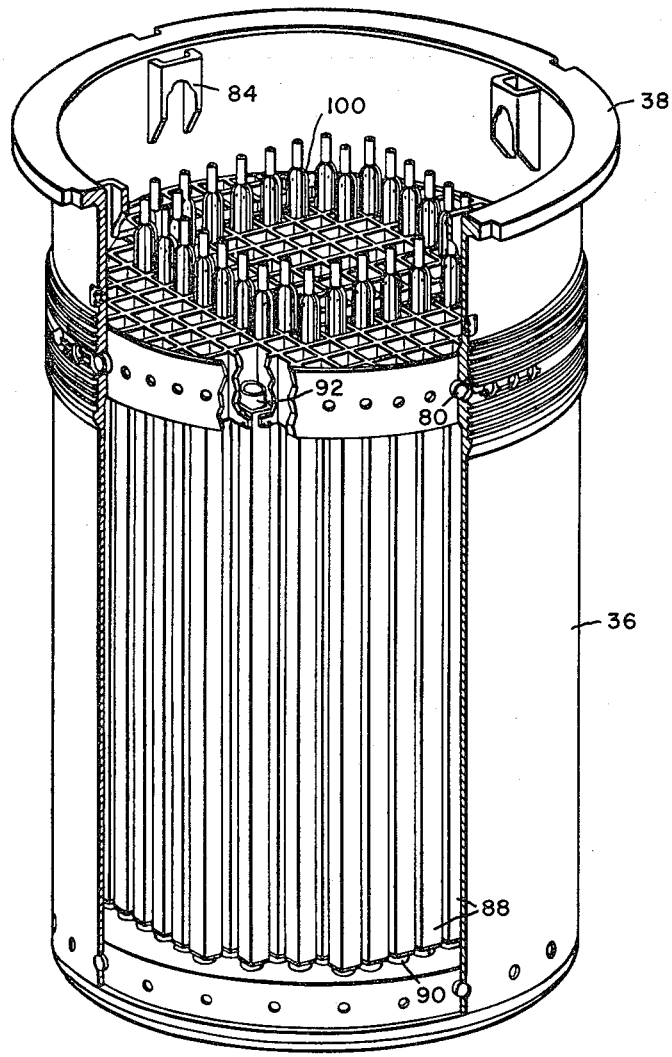
FIG. 4 is a perspective cut away view of the core barrel shown in FIG. 3 having the reactor core and control members located therein.

Referring specifically to FIGS. 3 and 4, it is to be noted that the core barrel 36 provides the container for the entire reactor core. The lower end of the core barrel 36 is provided with a bottom grid 72 extending completely across the open end thereof. The bottom grid 72 may preferably be secured to the core barrel by means of spaced keys 74. The core barrel is additionally provided with a top grid 78 adjacent the upper end thereof which also may be secured by means of keys 80. The bottom grid 72 is provided with a plurality of circular openings 76 extending axially therethrough and the top grid 78 is provided with a plurality of squared openings 82 which are aligned with the circular openings 76 of the bottom grid. The upper edge of the core barrel may also be provided with a plurality of spaced lifting lugs 84 for moving the core into and out of the vessel 2.

Figure 5:
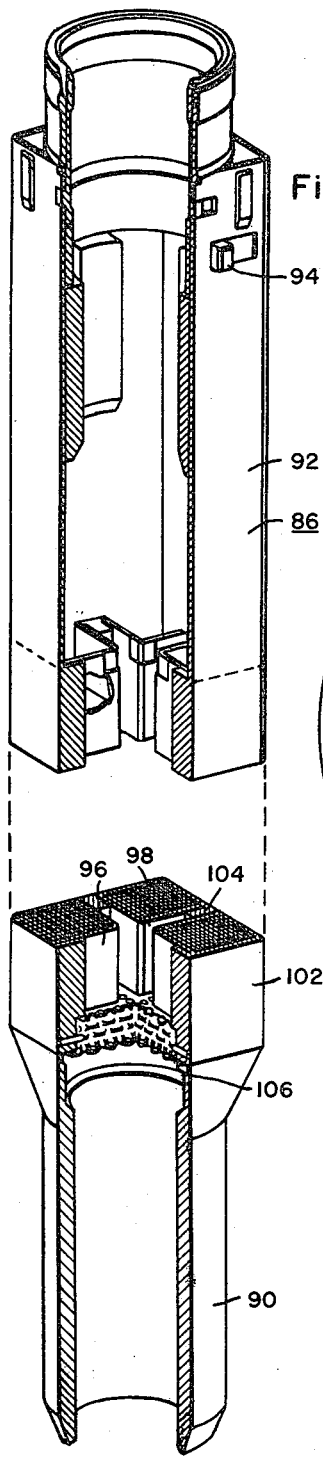
FIG. 5 is a perspective cut away view of a fuel element used in the reactor core shown in FIG. 1 and having means therein for locating a control rod.

The top and bottom grids 78 and 72 serve to locate and support the reactor core compartments in predetermined positions. The reactor core comprises a plurality of seed assemblies 86 (FIG. 5) and a plurality of blanket assemblies 88 (FIG. 7). Each of the assemblies 86 and 88 are preferably provided with a circular lower extension 90 (FIG. 5) extending outwardly from the lower end thereof and adapted to be located in the openings 76 of the bottom grid 72. The assemblies are preferably squared in cross-section and are provided with square upper extensions 92 which are adapted to fit into the squared openings 82 in the top grid 78. To secure the assemblies in the core barrel, the assemblies may be provided with a plurality of lugs 94 extending outwardly from the upper extensions 92 thereof. The lugs 94 are preferably rotatable in a horizontal plane so that they are located entirely within the outer periphery of the upper extension 92 at one rotative position. At their other rotative position, the lugs 94 extend outwardly from the side of the upper extension 92. The lugs 94 are preferably located to be slightly below the lower edge of the top support grid 78 so that they are adapted to engage the latter edge in their second rotative position to prevent longitudinal motion of the assembly. While the blanket assemblies 88 are not shown to have an upper extension 92 and a lower extension 88, it is to be noted that each blanket assembly is preferably provided with upper and lower extensions in the same manner as is shown for the seed assemblies 86. Accordingly, each assembly is secured in the core barrel 36 by lowering them through the squared openings 82 in the top grid 78. During installation of the assemblies it is to be noted that the lugs 94 are maintained in the position where they are entirely within the outer periphery of the assemblies. The bottom extension 90 is then inserted into one of the openings 76 in the bottom grid 72 and the lugs 94 are rotated to their other position to secure the assemblies in the core barrel.

To assemble the reactor in the pressure vessel, each of the assemblies is preferably inserted in the core barrel in the manner previously described. The thermal shields 25 and 26 having the flow guide 28 attached thereto are first lowered into the pressure vessel 2 until the upper flange 32 engages the peripheral ledge 30 in the pressure vessel 2. The core support spring 34 is then lowered into the pressure vessel 2 until its lower edge engages the upper end of the flange 32. The core barrel 36 with the core and control rods assembled therein is then lowered into the reactor until its support flange 38 engages the upper end of the core support spring 34. The hold-down barrel 40 is inserted through the top of the pressure vessel and lowered until the lower flange 42 thereon engages the support flange 38 of the core barrel 36. The head 6 is placed on the top of the pressure vessel 2 and the seal weld 24 is made. The hold-down bolts 12 are then secured to the flanges 8 and 10, respectively.

Figure 6:
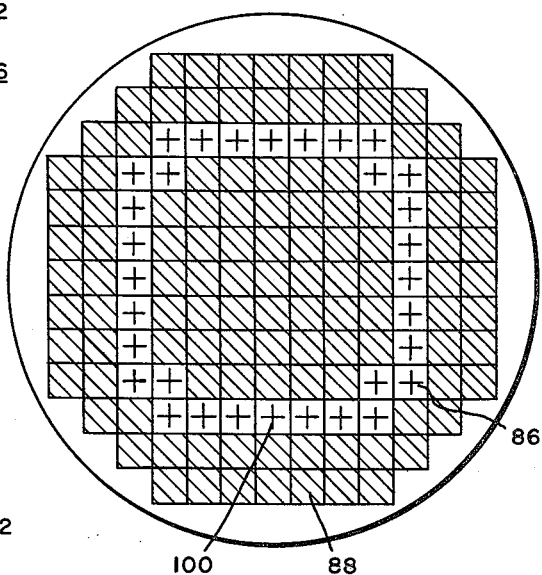
FIG. 6 is a sectional view of the reactor core shown in FIGS. 2 and 4.

Viewing FIG. 6, it is to be noted that the reactor core comprises 32 seed assemblies 86 forming an annular ring therein and 113 blanket assemblies 88 surrounding the seed. Each of the seed assemblies 86 is constructed of four bundles or subassemblies 96 of fuel plates. The seed assembly 86 is also provided with a cruciform shaped opening 98 therein for location of a cruciform shaped control rod 100. Each of the seed subassemblies 96 preferably comprises a plurality of stacked clad fuel plates formed to contain an enriched fissionable material such, for example, as $U^{235}$. The fuel plates may preferably be formed from an alloy or uranium in the manner shown and described in application Serial No. 558,863, filed January 13, 1956, by B. Lustman and R. K. McGeary, entitled "Clad Alloy Elements," and assigned to the same assignee as the present invention. The subassemblies 96 are formed by securing axial spacers along the sides of the individual fuel plates. The spacers form the side wall of the subassembly and the end walls thereof are formed by securing end plates to the outer fuel plates. Four subassemblies 96 are then secured in a modula box 102, and spacers 104 are located between adjacent sides of the subassemblies to provide the control rod channels. It is to be noted that the upper and lower extensions 92 and 90 for the assembly are hollowed to permit coolant to flow therethrough. Each assembly is additionally provided with suitable orifices 106 adjacent the lower ends thereof to regulate the amount of coolant flowing through the assembly.

The blanket assemblies 88 (FIG. 7) are preferably formed in the same manner as the seed subassemblies 96 and comprise a plurality of stacked fuel plates 108 having spacers 110 therebetween. The spacers 110 and the side edges of the fuel plates 108 form two parallel sides of the subassemblies 88 and the other side walls are formed by end plates 112 containing no fuel therein and constructed of a material having a low neutron cross-section such, for example, as zirconium or a zirconium alloy.

Viewing FIG. 8, it is to be noted that the blanket fuel elements constructed in accordance with the principles of this invention comprise a sandwich-type element having a central filler plate 114 and a pair of flat cladding plates 116. The cladding plates and the filler plate are preferably constructed of a material which has properties of sufficient structural strength and a low neutron absorption cross-section such, for example, as zirconium or a zirconium alloy, stainless steel or combinations thereof. The filler plate 114 is provided with a plurality of compartments 118 therein which may be formed by any suitable means such, for example, as by stamping them out of the filler plate or by assembling a plurality of picture frame members and securing the individual members together. Each of the compartments 118 is provided for the location of the fuel wafer 120 which may comprise a fissile material such as $U^{235}$, $U^{238}$ or $Pu^{239}$. The fuel wafer may either be formed as a metal alloy or as a compact of ceramic material such as uranium dioxide and may preferably be compacted by suitable means, such for example, as extrusion. To fabricate a blanket fuel plate 108, one cladding plate 116 is preferably secured to one side of the filler plate 114. A fuel wafer 120 is located in each of the compartments 118 and the other cladding plate 116 is secured to the open side of the filler plate 114. The cladding plates 116 may be secured to the filler plate 114 by suitable bonding means such, for example, as by welding, rolling or brazing, so that all mating surfaces on the filler plate 114 and the cladding plates 116 are joined together. Each of the compartments 118 is constructed to extend longitudinally along the water channel located between two adjacent fuel plates 108 rather than transversely thereacross. Accordingly if a portion of the cladding plates 116 enclosing one of the compartments 118 should rupture and extend outwardly into the water channel, it will block only a small portion of the water flowing in the channel rather than block the whole channel.

For specific dimensions of a reactor in which fuel elements of the type described herein may be utilized, reference is made to Table II. Several parameters of fuel elements of this type are compared with a pressurized water reactor utilizing rod-type fuel elements such as the reactor shown and described in A/conf./8/P/815, dated June 30, 1955, and entitled "Description of the Pressurized Water Reactor (PWR) Power Plant at Shippingport, Pennsylvania."

TABLE II

*Physical Data*

Seed Region:
| | |
|---|---|
| Active length, in | 70.75 |
| Plate thickness, in | 0.069 |
| Cladding thickness, in | 0.015 |
| Channel thickness, in | 0.069 |
| Channel width, in | 2.25 |
| Plate width, active portion, in | 2.05 |
| Plates per seed assembly | 60 |
| Number of seed assemblies | 32 |
| Total number of plates | 1,914 |
| Coolant flow area, sq. ft | 2.20 |
| Heat transfer area, sq. ft | 3,855 |
| Equivalent hydraulic diameter, ft | 0.0112 |
| Zirconium, total tons | 4.50 |
| Uranium-235 loading cap, kg | 75.0 |

Control Rods:
| | |
|---|---|
| Material | Hafnium |
| Number | 32 |
| Span width, in | 3.37 |
| Plate width, in | 1.575 |
| Plate thickness, in | .225 |
| Active length, in | 70.57 |

| | Plate type fuel elements | Rod type fuel elements |
|---|---|---|
| Blanket Region: | | |
| Assembly width, in | 5.6 | |
| Assembly thickness, in | 5.6 | |
| Side plate thickness, in | 0.020 | |
| Dead edge space, in | 0.10 | |
| Active fuel width, in | 5.0 | |
| Water channel width, in | 5.2 | |
| End plate thickness, in | 0.20 | |
| Water channel thickness, in | 0.075 | |
| Number of plates per assembly | 25 | |
| Fuel thickness, in | 0.092 | |
| Clad-plate thickness, in | 0.019 | |
| Fuel compartment width, in | 0.464 | |
| Fuel compartment length, in | 5.963 | |
| Number of compartments per plate | 120 | |
| Filler plate thickness | | |
| Active fuel length, in | 71.556 | 63.5 |
| Fuel wafer width, in | 0.464 | |
| Fuel wafer length, in | 5.963 | |
| Number of fuel wafers per compartment | 1 | |
| Number of fuel wafers per fuel plate | 120 | |
| Total number of fuel wafers | 339,000 | |
| Total number of plates | 2,825 | |
| Fuel material | (1) | (1) |
| Weight of fuel material, tons | 16.04 | 15.88 |
| Weight of Uranium²³⁵, tons | 14.14 | 14.0 |
| Clad material | (2) | (2) |
| Weight of clad material per plate, lbs | 5.26 | |
| Weight of clad material per assembly, lbs | 174 | |
| Weight of clad material in blanket, tons | 9.83 | 7.93 |
| Spacer thickness, in | 0.092 | |
| Spacer width, in | 0.040 | |
| Total heat transfer surface, sq. ft | 13,027 | 7,949 |
| Flow area per assembly, sq. in | 10.14 | 10.87 |
| Total blanket flow area, sq. ft | 7.957 | 8.53 |
| Hydraulic diameter, in | .140 | .252 |

¹ Uranium dioxide.
² Zirconium alloy.

It is to be noted from Table II that the total heat transfer surface for the core blanket having fuel elements of the dimensions described is more than 5,000 sq. ft. greater than the blanket heat transfer surface available for rod type fuel elements having the dimensions described in the above-mentioned publication. Accordingly, the present invention provides a fuel element having substantially greater heat transfer area than existing tubular fuel elements. It is to be noted, however, that if rod type fuel elements were fabricated to substantially the same thickness of the compartmented fuel plates, the rod type fuel elements would still have many disadvantages when compared to compartmented plate type fuel elements. One obvious disadvantage would be that a greater number of fuel rods would have to be fabricated. Another disadvantage is that the center line temperature of the fuel rod would be greater than the center temperature of a compartmented fuel plate. This disadvantage is brought out in Table III which compares the center line temperatureof existing fuel rods with the center line temperature of fuel in compartmented fuel plates and also compares the latter to the center line temperatures of a fuel rod having the same fuel and cladding thickness as the fuel plate.

TABLE III

| Heat flux, B.t.u./ hr.—ft² | Fuel element center line temperature, °F. | | |
|---|---|---|---|
| | 0.411 in. rod, fuel diameter = 0.358 in. | 0.130 in. plate, fuel thickness = 0.092 in. | 0.130 in. rod, fuel diameter = 0.092 in. |
| 320,000 | 3,480 | 1,320 | 1,580 |
| 500,000 | >5,000 | 1,720 | 2,110 |

The heat fluxes chosen for Table III are calculated to represent the average heat flux in the blanket region of a pressurized water seed-blanket reactor at the beginning of life and the average heat flux in the blanket region at the end of life. It is to be noted that one characteristic of a seed-blanket reactor is that the flux increases in the blanket region with the age of the core. It is to be further noted that the melting point of uranium dioxide fuel is substantially 5,000° F., and the center line temperature of any fuel element must always be lower than that value, or else failure of the fuel element will occur. Accordingly, the lower the center line temperature of a given fuel element at a given flux level, the longer the lifetime of the fuel element. It is to be noted upon viewing of Table III that fuel elements of the compartmented plate type have a lower center line temperature at a given flux level than a rod type fuel element of substantially the same dimensions. It is to be further noted that fuel elements of the compartmented plate type may include a fuel meat having relatively low corrosion resistance, for a cladding void of fuel elements of this type does not lead to ultimate failure of the whole fuel element. The failure is confined merely to the compartments directly exposed to the failed portion. Thus, fuel elements of this type are not susceptible to a continuous failure but act to limit any failures to a relatively small portion of the fuel element.

In the foregoing description there has been described a new and improved plate fuel element having a plurality of fuel wafers located in a central filler plate and enclosed therein by cladding plates whereby all of the mating surfaces on the cladding plates and the filler plate are bonded together in fuel elements of this type. There have been shown advantages over existing fuel elements and additionally it is to be noted that the fuel meat is not required to be bonded to the cladding. Fuel elements of this type may be fabricated to final dimensions eliminating the need for elongation in size and reduction of thickness, thereby providing a final structure having a uniform cross-section of fuel per unit area.

While there is shown and described a certain specific embodiment of this invention, many modifications thereof are possible without departing from the spirit and scope thereof. It is, therefore, intended that all matter contained in the foregoing description or shown in the accompanying drawings shall be interpreted as illustrative and not in a limiting sense.

We claim as our invention:

1. A sandwich-type fuel element for a neutronic reactor comprising, a flat filler plate having a plurality of holes therein, fissile material located in each of said holes and a pair of cladding plates secured to said filler plate and cooperating therewith to completely enclose said fissile material in each of said holes, the cladding plates being unbounded to the fissile material.

2. In a neutronic reactor, an elongated plate-type fuel element comprising a filler plate constructed of a material having a low thermal neutron cross-section and having a plurality of holes therein spaced from the outer edges thereof uniformly spaced from each other, a fissile material in ceramic form filling each of said holes and a cladding plate constructed of the same material as said filler plate secured to each side of the latter to totally enclose said fissile material in said fuel element, the cladding plates being unbonded to the fissile material.

3. A sandwich-type fuel element for a neutronic reactor comprising a flat filler plate formed from a metal selected from the group of aluminum, stainless steel, zirconium and zirconium alloys, and having a plurality of uniformly sized and spaced compartments therein, fissile material in the form of a compact ceramic powder located in each of said compartments, a pair of cladding plates formed of the same material as said filler plate secured on each side of the filler plate and cooperating with the latter to totally enclose said fissile material in said compartments, the cladding plates being unbonded to said fissile material.

4. A sandwich-type fuel element for a neutronic reactor comprising, a flat filler plate having a plurality of equally sized rectangular holes therein, a pair of flat cladding plates of a size to completely enclose said holes, fissile material filling each of said holes and unbonded to said filler plate and said cladding plates, said cladding plates secured to each side of said filler plate and cooperating therewith to sealingly enclose said fissile material in said holes.

References Cited in the file of this patent

UNITED STATES PATENTS

| | | |
|---|---|---|
| 2,872,388 | Fahnoe et al. | Feb. 3, 1959 |
| 2,894,893 | Carney | July 14, 1959 |

OTHER REFERENCES

TID 4562, November 1956, page 4 relied upon.

AEC Document WAPD–MRP–66, PWR Report for Dec. 24, 1956, to Feb. 23, 1957, pages 54–55.

AEC Document WAPD–MRP–67, Feb. 24, 1957, to Apr. 23, 1957, pages 42–43.

AEC Document WAPD–MRP–68, Apr. 24, 1957, to June 23, 1957, pages 78–80.

International Conference on the Peaceful Uses of Atomic Energy, 1955, vol. 9, pp. 203–207.